United States Patent [19]
Greene et al.

[11] Patent Number: 5,769,362
[45] Date of Patent: Jun. 23, 1998

[54] AIRCRAFT CONTROL MECHANISM FOR A SPEED BRAKE

[75] Inventors: Leonard M. Greene, Scarsdale; Jack Steiner, Yorktown, both of N.Y.

[73] Assignee: Safe Flight Instrument Corporation, White Plains, N.Y.

[21] Appl. No.: 639,521

[22] Filed: May 1, 1996

[51] Int. Cl.⁶ .................. B64C 3/58; B64C 9/32
[52] U.S. Cl. .................. 244/197; 244/76 A; 244/110 D
[58] Field of Search ............ 244/110 D, 113, 244/76 A, 196, 197

[56] References Cited

U.S. PATENT DOCUMENTS

| | | |
|---|---|---|
| 1,015,861 | 1/1912 | Warner . |
| 1,518,360 | 12/1924 | Royce . |
| 1,861,251 | 5/1932 | Wemp . |
| 2,155,513 | 4/1939 | Tampier . |
| 2,356,597 | 8/1944 | Kronenberger ................ 244/197 |
| 2,926,765 | 3/1960 | Heid . |
| 2,951,570 | 9/1960 | Antrim, Jr. et al. . |
| 3,140,843 | 7/1964 | Pettit ........................ 244/197 |
| 3,578,267 | 5/1971 | Kazmarek ................... 244/197 |
| 4,425,989 | 1/1984 | Gotoda . |
| 4,865,269 | 9/1989 | Metcalf . |
| 4,883,152 | 11/1989 | Froment . |
| 4,930,730 | 6/1990 | Quick . |
| 5,010,970 | 4/1991 | Yamamoto . |
| 5,025,680 | 6/1991 | Umeyama et al. . |
| 5,032,107 | 7/1991 | Umeyama et al. . |
| 5,099,972 | 3/1992 | Ouchi . |
| 5,613,652 | 3/1997 | Greene ........................ 244/197 X |

FOREIGN PATENT DOCUMENTS

| | | | |
|---|---|---|---|
| 2700918 | 7/1978 | Germany ............... | 244/196 |

*Primary Examiner*—William Grant
*Attorney, Agent, or Firm*—David E. Dougherty

[57] ABSTRACT

An aircraft control mechanism for a speed brake includes a shaft, an outer sleeve surrounding the shaft and a sprag clutch. The mechanism also includes input and output elements and a control element with the input element tied to the outer sleeve. The control element is tied to the shaft and the output is operatively connected to the output of the clutch. A control cable is connected to the output for moving a speed brake between a first and a second position. A manual input actuates the control element of the clutch. An automatic input is connected to the outer sleeve through a torsional dampening device which minimizes chatter or sticking due to high forces which are required to extricate the sprag clutch from a relatively high racked-in load.

9 Claims, 5 Drawing Sheets

AIRCRAFT CONTROL MECHANISM FOR A SPEED BRAKE

FIELD OF THE INVENTION

This invention relates to an aircraft control mechanism for speed brakes or the like and more particularly to an aircraft control mechanism having automatic and manual inputs and means for reducing chatter or sticking due to relatively high torque which is required to overcome relatively high racked-in loads.

BACKGROUND FOR THE INVENTION

Today commercial jet aircraft typically include speed brakes and an actuating mechanism which allows automatic and manual controls for deployment of the speed brake with a manual override capability. In some such aircraft, the mechanism is subjected to relatively high forces generated by stretching of the aircraft control cable which is a necessary part of the operating cycle. This stretching of the cable subjects a sprag clutch which is a part of the mechanism to a relatively high racked-in load. The result is that there is a need for a relatively high torque to extricate the clutch from the racked-in condition. The combined effect of the high force which is required by the racked-in condition going immediately into a following mode has in some cases produced an objectionable stick-slip motion or chatter.

Auto power clutch assemblies are well known for aircraft control systems and typically include a reverse locking clutch and a torque limiter. For example, Safe Flight Instrument Corporation offers an auto power clutch assembly as a component for an automatic throttle system. Such systems control aircraft engine thrust and include a clutch assembly for each engine. These assemblies are driven from a common servo drive shaft coupled to an irreversible gear box which in turn is coupled to a servo motor.

These auto power clutch assemblies permit automatic servo operated throttle control with provision for thrust level override or adjustment by the pilot. When the automatic throttle system is driving the throttles, the pilot's thrust levers move as they would if they were being positioned manually. A clutch assembly of this type was tested in connection with a speed brake, but did not eliminate the chatter which resulted from a high racked in load.

It has now been found that an aircraft control mechanism in accordance with the present invention overcomes the problem associated with the stick-slip or chatter and produces a smooth response in all phases of the cycle, In addition such mechanisms are durable, highly reliable and suitable for use on commercial aircraft. It is also presently believed that the control mechanism in accordance with the present invention can be manufactured and sold at a competitive price.

BRIEF SUMMARY OF THE INVENTION

In essence, the invention contemplates an aircraft control mechanism for a speed brake or the like wherein the mechanism is subjected to a relatively high racked-in load. The mechanism includes a shaft, an outer sleeve surrounding the shaft and a sprag clutch. The mechanism also includes an input element, an output element and a control element with the input element operatively connected or tied to the outer sleeve. The control element is operatively connected or tied to the shaft and the output means such as a sheave is operatively connected or tied to the output element of the clutch. An actuating means such as a control cable is operatively connected to the output means or sheave for moving a speed brake or the like between a first and a second position. A manual input is tied to the shaft for actuating the control element of the clutch. In addition, an automatic input is operatively connected or tied to the outer sleeve through a torsional damping device. The torsional damping device includes a spring biased friction element and a spring coupling device in parallel with the friction element and in series with the sprag clutch. The assembly is constructed and arranged so that the torsional damping device minimizes any chatter or sticking due to the high forces required to extricate the sprag clutch from the relatively high racked-in load to move the control cable.

The invention will now be described in connection with the accompanying drawings wherein like reference numerals have been used to define like parts.

DETAILED DESCRIPTION OF THE PREFERRED EMBODIMENT OF THE INVENTION

Figure 1:
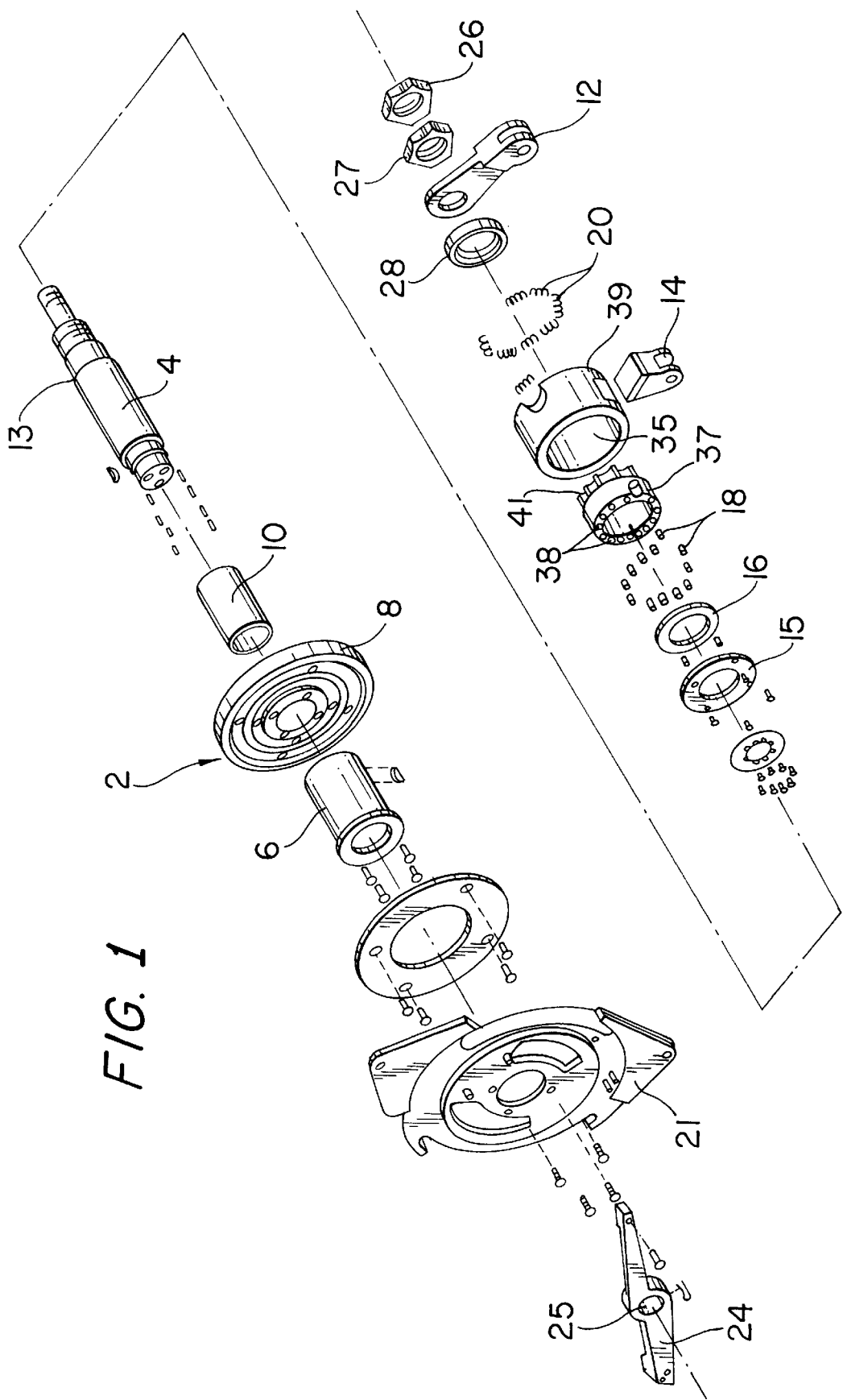
FIG. 1 is an exploded perspective view of a control mechanism in accordance with a preferred embodiment of the invention.

An aircraft control mechanism is shown in FIGS. 1–5. As illustrated, the aircraft control mechanism 2 is suitable for use with an aircraft speed brake or other systems in which relatively high torque is required to overcome a relatively high racked-in-load. The mechanism 2 includes a central shaft 4 and an outer cylindrical sleeve 6 surrounding the central shaft 4. A sprag clutch 8 is fixed to the outer sleeve 6. The sleeve 6 is separated from the central shaft 4 by a cylindrical bearing 10 of any suitable material as will be well understood by one of ordinary skill in the art. The shaft 4, outer sleeve 6, clutch 8 and bearing 10 are constructed and arranged so that the outer sleeve 6 including the sprag clutch 8 which is fixed thereto can rotate with respect to the shaft 4 with a relatively tight fit between the shaft 4, bearing 10 and sleeve 6.

A manual input member 12 is operatively connected or fixed to a first portion of the shaft 4, i.e., near one end thereof so that any movement of the member 12 rotates the shaft 4.

The torsional damping device transmits torque from the automatic input member 14 to the outer sleeve 6 through two parallel torque paths. The first path transmits torque through a spring biased friction element while the second path transmits torque through a spring coupling device.

Both the spring biased friction element and the spring coupling device have several parts in common and the friction element will be described first. The friction element comprises an inner shell 37 keyed to the outer sleeve 6. An outer shell 39 surrounds the inner shell 37 and is radially spaced therefrom. The outer shell 39 has a first friction disk 15 which protrudes radially inwardly. This first friction disk 15 cooperates with a second friction disk 33 and a pressure plate 16 mounted on the inner shell. The second friction disk 33 is fixedly mounted to the inner shell 37 and does not move relative thereto. The pressure plate 16 is located on the opposite side of the first friction disk 15 and is mounted on the inner shell 37. Several circumferentially spaced pockets 38 in the inner shell 37 each contain an axially extending biasing spring 18. The springs 18 bias the pressure plate 16 towards the first friction disk 15. The spring biased friction element thus transmits limited amounts of torque from the outer shell 39 to the inner shell 37 via the friction disks (15, 33) as long as the amount of torque does not exceed the capacity of the friction element. When the amount of torque transmitted to the outer shell exceeds a predetermined amount, the normal force applied by the springs 18 times the coefficient of friction of the friction disks (1 5, 33), the disks (15, 33) will not provide enough friction to transmit torque from the first friction disk 15 to the second friction disks 33 and thus the disks will slip relative to one another. A similar device having several disks could be used in place of the preferred embodiment which discloses only two friction disks as an example.

The spring coupling device, like the friction element, is also located between the inner shell 37 and the outer shell 39. The outer shell 39 has a first set of radially inwardly protruding abutments 35 shown in FIG. 3, with location shown if FIG. 1) which protrude between the outer shell 39 and the inner shell 37. Likewise the inner shell 37 has a second set of radially outward protruding abutments 41 which protrude between the inner shell 37 and the outer shell 39. Between these sets of abutments (35, 41) are located several circumferentially extending springs 20 which limit relative rotation between the inner and outer shell by transmission of their spring force. The abutments (35, 41) from both the inner and outer shells (37, 39) will contact one another if sufficient torque is transmitted through the spring coupling such that it overcomes the spring force of the circumferentially extending springs 20. When this situation occurs, torque will be directly transmitted between the outer shell 39 and the inner shell 37 through the protruding abutments (35, 41).

In operation the torsional damping device will operate in three modes.

In a first mode when small amounts of torque are applied from the automatic input member 14 to the outer shell 39, torque will be transmitted mostly through the non-slipping friction element to the inner shell 37 and then through the key 42 and finally to the outer sleeve 6.

In a second mode when a higher amount of input torque is provided from the automatic input member 14 the friction element will to a certain degree slip and thus most of the torque will be transmitted through the spring coupling device. Any rotational vibration or oscillations present in the spring coupling device will be damped by the friction element which provides a constant drag on any relative rotation between the inner 37 and outer shells 39.

In a third mode of operation, when a relatively high amount of torque is provided by the automatic input member 14, all the torque will be transmitted from the outer shell 39 through the abutments (35, 41) located in the spring coupling device and neither the friction element nor the springs 20 in the spring coupling device will be transmitting torque.

A quadrant 21 or output member is disposed at one end of the assembly and includes an output sheave 22 which is constructed and arranged to move a control cable 23 to activate the speed brake or the like. A torque arm 24 is also disposed at the same end of the assembly 2 as quadrant 21 but outwardly therefrom and fixed to the end of shaft 4 by means of a screw 25 or the like, so that, the torque arm 24 moves in response to any rotational movement of the shaft 4.

Figure 2:
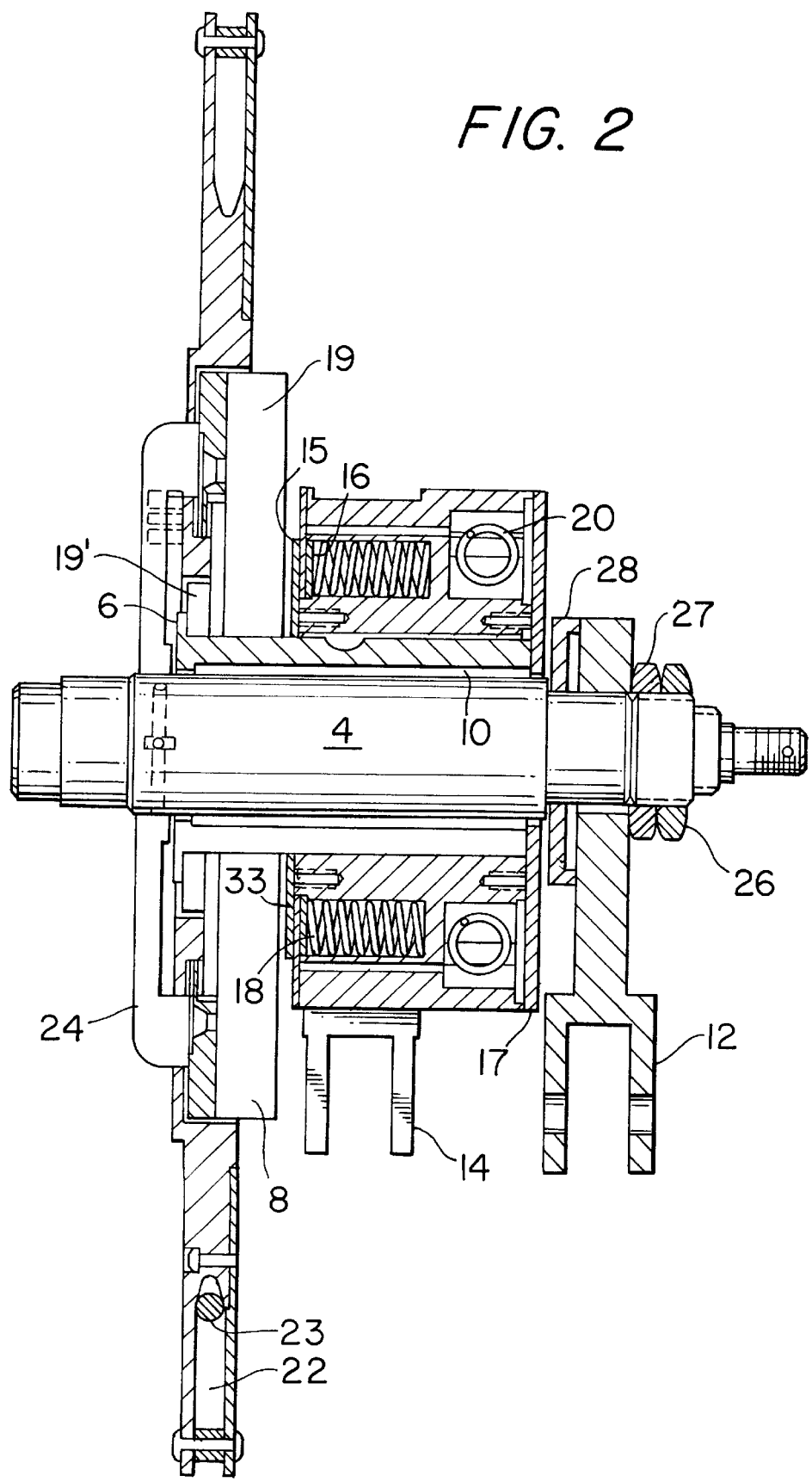
FIG. 2 is a cross sectional view of the control mechanism shown in FIG. 1.
Figure 3:
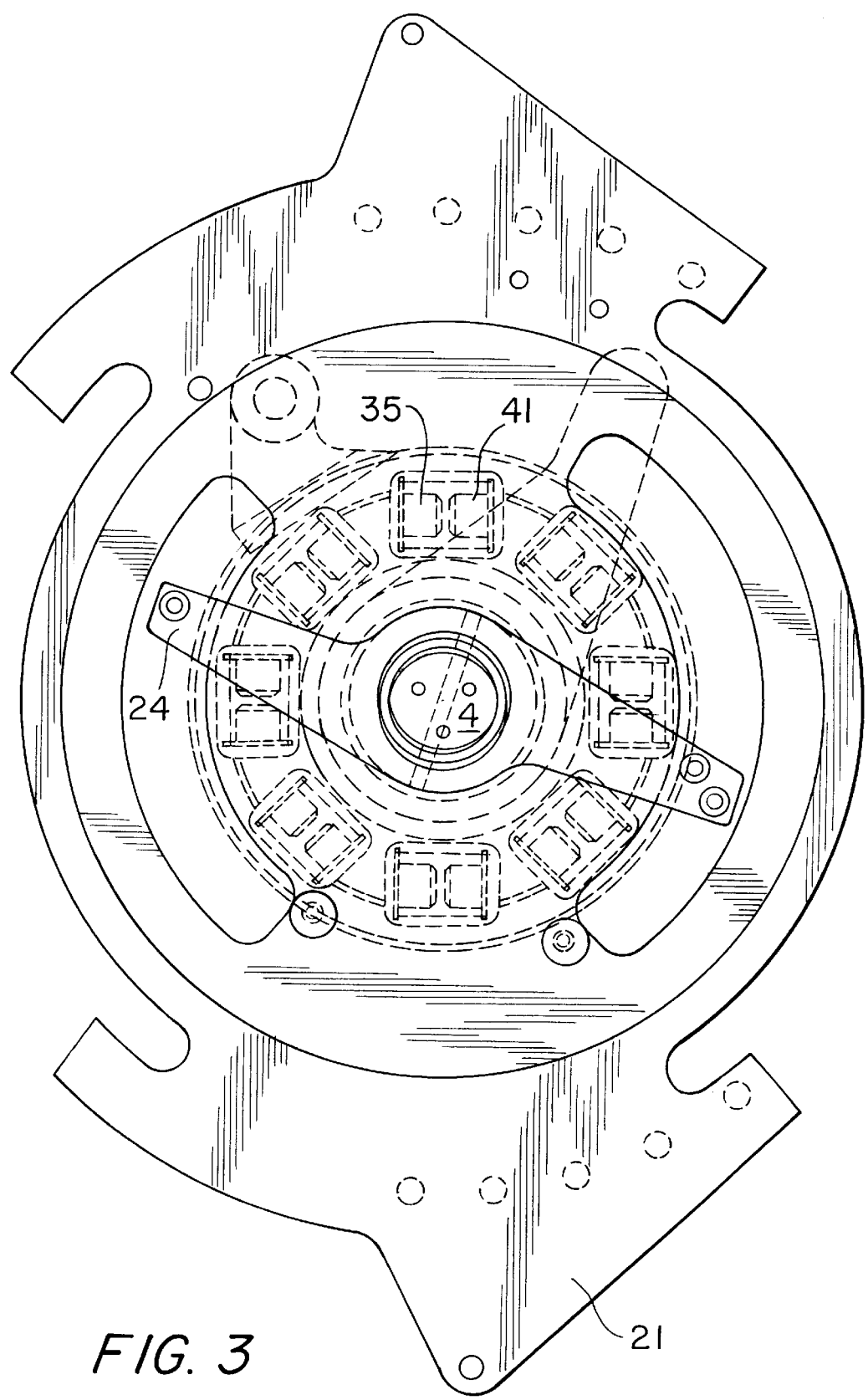
FIG. 3 is an end view of the control mechanism shown in FIG. 2.

As shown in FIGS. 1 and 2, the assembly 2 also includes a pair of locking nuts 26 and 27 at the opposite end of shaft 4 and a spacer 28 between the manual input member 12 and a shoulder 13 on the shaft 4 for separating the input member 12 from an outwardly extending portion of flange 17 on the outer sleeve 6. Spacers 19 and 19 are also disposed on the outer sleeve 6 for positioning the sprag clutch 8 on the outer sleeve 6.

Figure 5:
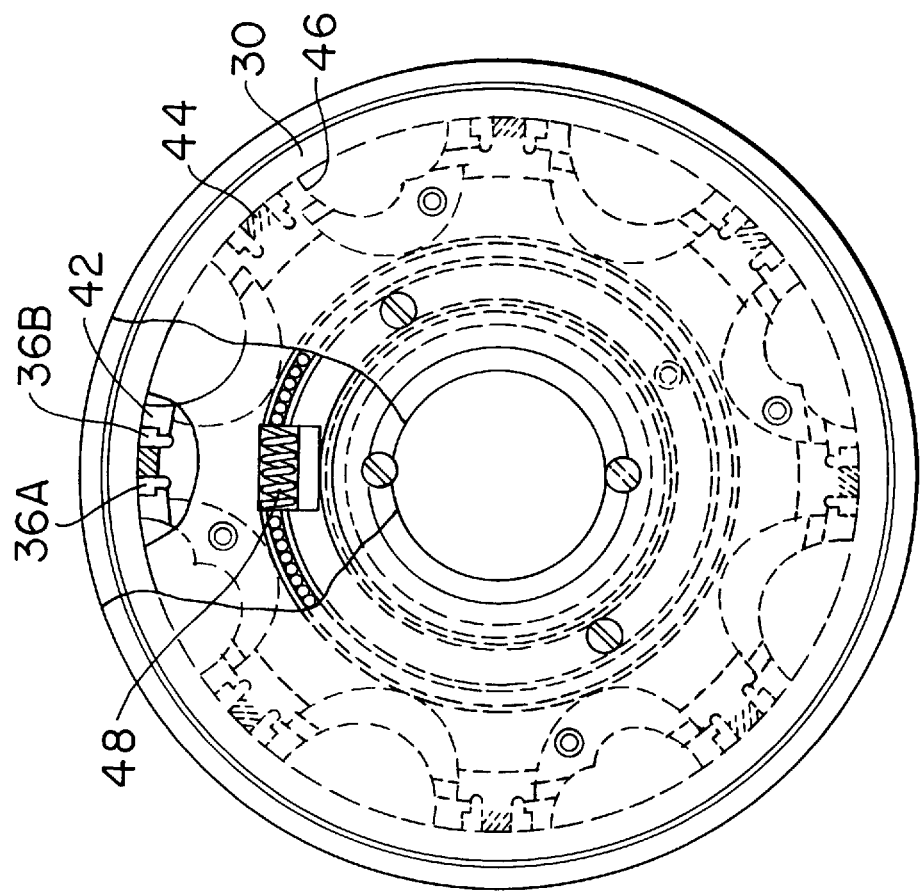
FIG. 5 is an end view of the clutch shown in FIG. 4.
Figure 4:
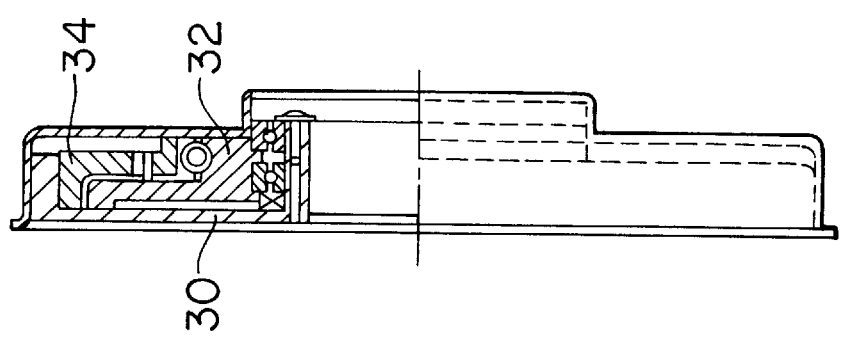
FIG. 4 is a cross sectional view of a sprag clutch which is suitable for use in the control mechanism in accordance with the preferred embodiment of the invention.
Figure 6:
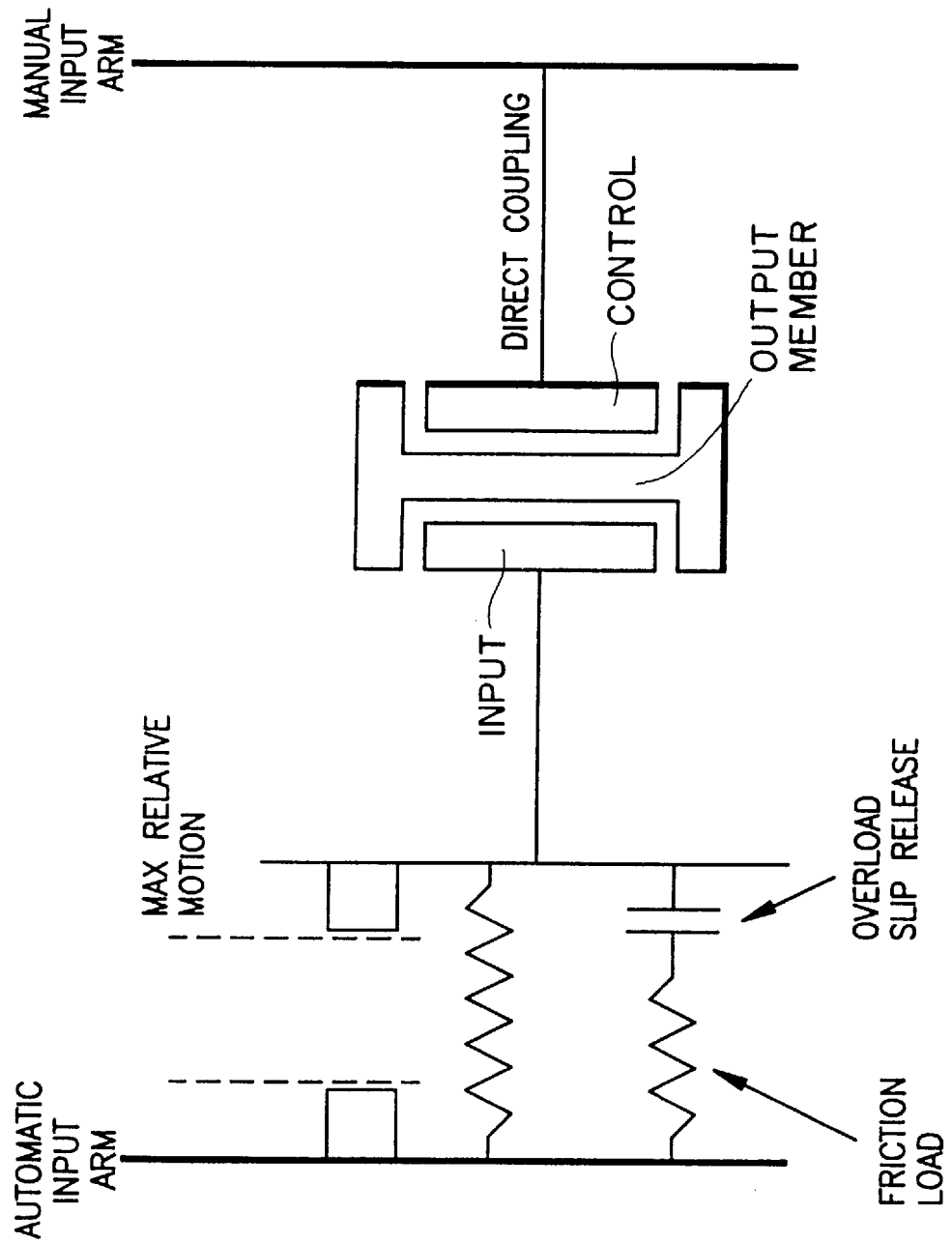
FIG. 6 is a schematic view which illustrates the operation of the control mechanism in accordance with the present invention.

The sprag clutch 8 shown in FIGS. 4 and 5 may be of a conventional design as for example a commercial product of Safe Flight Instrument Corporation. Safe Flight Instrument Corporation is the assignee of the present application.

The reverse locking sprag clutch 8 includes three concentric members, i.e., an input element 30, an output element 32, and a control element 34. The input element 30 is designed to accept a servo-motor input (not shown) and turns in response to the servo-control. The output and control elements 32 and 34 are capable of rotation independent of the input element 30. The output element 32 is also linked to a speed brake or the like through a sheave-and-cable arrangement, while the control element 34 is connected to the pilots cockpit controls for actuation by a pilot through appropriate linkage.

In automatic operation the servo-torque drives the clutch input element 30 and through the action of a driving sprag 36 drives the output member 32. Since the clutch input element 30 drives the output 22 and control element 34, it controls the position of the pilot's control lever and the speed brake. However, in manual operation, the pilot's control lever drives the clutch control element 34. In this mode of operation the control element 34 disables the driving sprag and thereby releases the output element 32 from the input element 30 which consequently does not turn or feedback to the servo-motor. The other sprag of course is in an overrunning condition and therefore does not transmit torque.

FIG. 5 shows a cutaway view of the clutch at a sprag and finger position. The clutch may, for example, contain 8 pair of sprags. The inner end of each sprag is set in a socket 42 in the output element 32 and each sprag is able to pivot within its socket 42. A compression spring 44 within each pair of sprags normally holds those sprags in contact with the input element 30.

Viewed as shown in FIG. 5 in a first mode of operation, a counter clockwise rotation of the input element 30 drives the output element 32 instantaneously through driving sprag 36A. Sprag 36B trails and does not engage since it leans in the direction of the input element's 30 motion. Conversely, if the input element 30 turns clockwise sprag 36A engages the output element 32 and sprag 36B trails. The control element 34 is driven in the same direction as the input and output elements (30, 32). Coupling occurs immediately and force is transmitted to the control as the output member turns.

In a second mode of operation the control element 34 is driven directly by the pilot. The control element 34 then transmits torque directly to the output element 32 which in turn activates the air brake. The control element 34 also disengages the active sprag 36A so that no torque is transmitted between the control element 34 to the input element 30 allowing the input element 30 to remain stationary. If the direction of the control element 34 is reversed by the pilot, a similar but opposite action occurs. In either case the sprags will either be disengaged by a finger 46 of the control element 34 or be overrunning thus transmitting no torque from the control element 34 to the input element 30. Once the pilot ceases manual override, a neutralizing spring 48 realigns the control element 34 and the output element 32 so that the fingers 42 are no longer disabling the sprags and the system may once again resume automatic operation.

In the overall operation of the aircraft control mechanism 2, the speed brakes are normally controlled by the automatic input from a servo mechanism. The automatic input actuates automatic input member 14 which in turn transmits torque through the torsional damping device in one of its three modes, as discussed above, to the outer sleeve 6 which is tied to the input element 30 of the clutch 8. The input torque then proceeds both through a driving sprag to the output element 32 which controls the air brake itself and in addition to the control element 34 and through shaft 4 to the manual input member 12. From the pilots point of view of course the control levers for the air brake move in response to the motion of the automatic servos. When the automatic servo reverses direction and provides a reverse torque through the automatic input 14, torque is once again transmitted through the torsional damping device to the outer sleeve which is tied to the input member of the clutch. A fairly large amount of torque will be necessary to disengage the formerly driving, now overrunning sprag and engage the formally overrunning, now driving sprag as the input reverses direction. Any vibrations caused by this transition are absorbed by the torsional damper. The torque is then once again transmitted to both the output element 32 in order to control the air brake and also to the control element 34 which transmits torque back through the shaft 4 to the manual input 12.

In manual override mode the operation is somewhat different, the pilot actuates a control lever in the cockpit which applies a force to the manual input 12 which in turn, rotates shaft 4 and thus the control element 34 in the clutch 8. In a first direction, the control element 34 directly drives the output element 32 and actuates the air brake and also the control element 34 disengages the formally driving sprag of the sprag clutch. Any torque vibrations transmitted to the input element 30 during disengagement are dissipated by the torsional vibration damping device and no further torque is transmitted because the control element 34 disengages one sprag and the other sprag is overrunning. Therefore, a manual input can be placed on the clutch to control the output and yet no torque feeds back through the input member to the automatic servo. If the pilot applies torque in the opposite direction an analogous but exactly opposite operation occurs. In either type of operation, manual or automatic, any spurious torque spikes or vibrations caused by disengaging the sprag clutch is dissipated by the torsional damping device.

While the invention has been described in connection with a preferred embodiment it should be recognized that changes and modifications may be made therein without departing from the scope of the claims.

What is claimed is:

1. An aircraft control mechanism for a speed brake wherein the mechanism is subjected to a relatively high racked-in load, said mechanism comprising:

a shaft, an outer sleeve surrounding said shaft, a sprag clutch having an input element, an output element, a control element with said input element tied to said outer sleeve, said control element tied to said shaft and output means tied to said output element of said clutch, an actuating means operatively connected to said output means for moving a speed brake between a first and a second position, a manual input tied to said shaft for actuating said control element of said clutch, a torsional damping and limiting device and, an automatic input tied to said outer sleeve through said torsional damping and limiting device, said torsional damping and limiting device including a spring biased friction element and a spring coupling in parallel with said friction element and in series with said sprag clutch, whereby said torsional damping and limiting device minimizes any chatter or sticking due to the high forces required to extricate the sprag clutch from the relatively high racked-in load to move said control element.

2. An aircraft control mechanism according to claim 1 in which said actuating means is a control cable.

3. An aircraft control mechanism according to claim 2 in which said output means includes a sheave for transmitting motion to said control cable.

4. An aircraft control mechanism according to claim 1 in which said friction element is a friction disc which surrounds said shaft.

5. An aircraft control mechanism according to claim 4 which includes a pressure plate for exerting pressure against said friction disc.

6. An aircraft control mechanism according to claim 5 in which said torsional damping and limiting device includes a plurality of circumferentially spaced coil springs.

7. An aircraft control mechanism for a speed brake wherein the mechanism is subjected to a relatively high racked-in load, said mechanism comprising first and second rotatable shafts and a sprag clutch interconnecting said shafts, manual and automatic input means operatively connected to said first and second rotatable shafts respectively for controlling the speed brake, a torsional damping and limiting device including a spring biased friction element and a spring coupling in parallel with said friction element and in series with said sprag clutch whereby said torsional dampening and limiting device minimizes any chatter or sticking due to the high forces required to extricate the sprag clutch from the relatively high racked-in load.

8. An aircraft control mechanism according to claim 7 wherein a first of said manual and automatic input means is operatively connected to a first of said shafts and in which the other of said input means is operatively connected to the other od said shafts and wherein the relative movement of said shafts in response to said automatic input means repositions said manual input means.

9. An aircraft control mechanism according to claim 8 wherein said sprague clutch allows relative movement of said shafts in response to said manual input means without repositioning said automatic input means.

* * * * *